United States Patent [19]
Fenton

[11] Patent Number: 5,414,729
[45] Date of Patent: May 9, 1995

[54] PSEUDORANDOM NOISE RANGING RECEIVER WHICH COMPENSATES FOR MULTIPATH DISTORTION BY MAKING USE OF MULTIPLE CORRELATOR TIME DELAY SPACING

[75] Inventor: Patrick Fenton, Calgary, Canada

[73] Assignee: NovAtel Communications Ltd., Canada

[21] Appl. No.: 158,511

[22] Filed: Nov. 29, 1993

Related U.S. Application Data

[63] Continuation-in-part of Ser. No. 825,665, Jan. 24, 1992, abandoned.

[51] Int. Cl.⁶ .......................................... H04B 15/00
[52] U.S. Cl. .................................. 375/209; 380/34; 380/46; 342/357
[58] Field of Search .................. 375/1; 380/34, 46; 342/357

[56] References Cited

U.S. PATENT DOCUMENTS

| | | |
|---|---|---|
| 4,426,712 | 1/1984 | Gorski-Popiel . |
| 4,457,006 | 6/1984 | Maine . |
| 4,530,103 | 7/1985 | Mosley, Jr. et al. . |
| 4,611,333 | 9/1986 | McCallister et al. . |
| 4,706,286 | 11/1987 | Sturza . |
| 4,754,465 | 6/1988 | Trimble . |
| 4,785,463 | 11/1988 | Janc et al. . |
| 4,791,378 | 12/1988 | Waltham . |
| 4,800,577 | 1/1989 | Tachita et al. . |
| 4,807,256 | 2/1989 | Holmes et al. . |
| 4,821,294 | 4/1989 | Thomas, Jr. . |
| 4,894,842 | 1/1990 | Broekhoven et al. . |
| 5,101,416 | 3/1992 | Fenton et al. ................. 375/1 |

FOREIGN PATENT DOCUMENTS

| | | |
|---|---|---|
| 0312193 | 7/1988 | European Pat. Off. . |
| 0351156 | 7/1989 | European Pat. Off. . |
| 2215539 | 3/1988 | United Kingdom . |

OTHER PUBLICATIONS

Langley, R. B., "Why is the GPS Signal So Complex?", *GPS World*, May/Jun. 1990, pp. 56-59.
Article entitled *Proceedings of the Satellite Division International Technical Meeting*, Sep. 19-23, 1988.

*Primary Examiner*—David C. Cain
*Attorney, Agent, or Firm*—Cesari and McKenna

[57] ABSTRACT

A receiver for pseudorandom noise (PRN) encoded signals consisting of a sampling circuit, multiple carrier and code synchronizing circuits, and multiple digital correlators. The sampling circuit provides digital samples of a received composite signal to each of the several receiver channel circuits. The synchronizing circuits are preferably non-coherent, in the sense that they track any phase shifts in the received signal and adjust the frequency and phase of a locally generated carrier reference signal accordingly, even in the presence of Doppler or ionospheric distortion. The multiple correlators in each channel correlates the digital samples with locally generated PRN codes having multiple offsets, to produce a plurality of correlation signals. The plurality of correlation signals are fed to a parameter estimator, from which the delay and phase parameters of the direct path signal, as well as any multipath signals, may be estimated, and from which a range measurement may be corrected.

19 Claims, 10 Drawing Sheets

PSEUDORANDOM NOISE RANGING RECEIVER WHICH COMPENSATES FOR MULTIPATH DISTORTION BY MAKING USE OF MULTIPLE CORRELATOR TIME DELAY SPACING

CROSS-REFERENCE TO RELATED APPLICATION

This application is a continuation-in-part of a prior U.S. patent application Ser. No. 07/825,665 entitled "A Pseudorandom Noise Ranging Receiver Which Compensates for Multipath Distortion by Dynamically Adjusting the Time Delay Spacing Between Early and Late Correlators" filed Jan. 24, 1992, which is assigned to NovAtel Communications, Ltd now abandoned.

FIELD OF THE INVENTION

This invention relates generally to digital receivers for pseudorandom noise (PRN) encoded signals such as those used in passive ranging systems, and in particular to such a receiver that has been adapted for use in signaling environments susceptible to multipath fading.

BACKGROUND OF THE INVENTION

Passive ranging systems such as the United States' Global Positioning System (GPS) and the Russian Global Navigation System (GLONASS) allow a user to precisely determine latitude, longitude, elevation, and time of day. Ranging system receivers typically accomplish this by decoding several precisely-timed signals transmitted by a group of special satellites.

For example, within the GPS system, each signal transmitted by a satellite is modulated with low frequency (typically 50 Hz) digital data which indicates the satellite's position and time of day, normalized to Greenwich Mean Time. Each satellite signal is further modulated with a unique, high frequency pseudorandom noise (PRN) code, which provide a mechanism to precisely determine the line of sight signal transmission time from each satellite.

The GPS system satellite constellation has been placed in geostationary orbit such that at least four satellites are within a direct line of sight at any given position on the earth. A typical PRN receiver thus receives a composite signal consisting of several signals transmitted by the satellites, as well as any noise and interfering signals. A decoder or channel circuit may then recover one of the transmitted signals by correlating (multiplying) the composite signal with a locally generated reference version of the PRN code signal assigned to the particular satellite of interest. If the locally generated PRN reference signal is properly timed, the digital data from that particular satellite may then be properly detected.

The signals received from different satellites are also automatically separated by the multiplying process, because the signals transmitted by different satellites use unique PRN codes having low or zero cross-correlation power. The three dimensional position of the receiver and its velocity may then be resolved by using the PRN code phase information to precisely determine the transmission time from at least four satellites, and by detecting each satellite's ephemeris and time of day data.

In order to correctly determine the offset of the PRN reference signal, its relative time delay is typically varied relative to the incoming signal until a maximum power level in the resulting correlation signal is determined. At the time offset corresponding to this point of maximum received power, the local reference signal is considered to be in synchronism with the incoming signal, and the range measurement may then be made. A so-called delay lock loop (DLL) tracking system which correlates early, punctual, and late versions of the locally generated PRN code signal against the received composite signal thus performs these operations to maintain PRN code lock in each channel.

Because of this need to precisely determine the exact propagation time, a number of problems face the designers of PRN receivers. One problem concerns accurate phase and frequency tracking of the received signals; another problem concerns the correction of relative divergence between the received signals and the local PRN code signal generators in the presence of ionospheric distortion.

In addition, because GPS systems depend upon direct line of sight for communication propagation, any multipath fading can further distort received signal timing estimates. In the ideal system, only one signal, the signal taking the direct or shortest path, is present. However, since the transmitter uses an omnidirectional (wide angle) antenna for maximum coverage, and since it is so far away from the receiver, the presence of surrounding reflecting objects such as buildings and natural surface formations means that there are typically multiple paths for the signal to take. Such a multipath signal takes a slightly different and longer router and thus arrives at the receiver at a different time.

The exact number of multipath signals present at any given moment is a function of the satellite and antenna positions relative to any and all reflecting objects. Therefore, in the typical situation, there may be none, or there may be many multipath signals. Since the multipath signals travel a longer distance they will always be received at some time after the direct path signal and will inevitably suffer a loss in power due to the reflection(s). This time delay equals the difference in length between the direct path and the reflected path divided by the propagation velocity.

The effect of the presence of multipath on the process of acquiring code lock is that there will always be some correlation with the multipath signals as well as with the desired, direct path signal.

The typical way of dealing with this is to design the PRN autocorrelation functions such that even a small offset from zero in time will yield a near zero value in the estimate of the autocorrelation function. In reality, however, the autocorrelation power decreases linearly as the time offset increases, in either the position or negative directions The multipath correlation power only reaches zero when the PRN code offset is greater than plus or minus one chip. Since the carrier sampling rate is usually much higher than the PRN code chipping rate, partial correlations will occur at sub-chip offsets.

Thus, in the presence of multipath distortion, most GPS receivers suffer a degradation in accuracy and an increase in processing time. This is especially true in high accuracy differential GPS applications, where pseudorange multipath will result in errors creeping into the differential corrections, causing large position biases.

Unlike other error sources, multipath is typically uncorrelated between antenna locations. Thus, the base and remote receivers experience different multipath interference and as a result, simple differencing between them will not cancel the errors due to multipath distortion. Also, modelling multipath for each antenna location is difficult and impractical.

A common method of reducing multipath is to carefully choose the design of the antenna and careful site selection. Unfortunately, it is often not possible to change either of these parameters. For example, if the antenna is to be mounted on an airplane fuselage, it will not be easily moved or replaced, and its shape is recessively restricted due to aerodynamic considerations.

What is needed is a way to reduce the tracking errors present in PRN ranging receivers, especially those of the lower-frequency C/A code type, in the presence of multipath fading, without degrading the signal acquisition capability of the receiver, or increasing errors due to Doppler shift, sudden receiver motion, or other noise sources. The desired method of reducing multipath distortion would be transparent to user, and operate within the GPS receiver itself, as opposed to requiring a special antenna or receiver siting.

SUMMARY OF THE INVENTION

Briefly, the invention is an improved receiver for pseudorandom noise (PRN) encoded signals consisting of a sampling circuit, multiple carrier and code synchronizing circuits, and multiple correlators, with each correlator having a selectable code delay spacing. The time delay spacing of the multiple correlators is distributed around an expected correlation peak to produce an estimate of the correlation function parameters which vary with respect to multipath distortion. The parameters of interest discernable from an estimate of the shape of the autocorrelation peak include the direct signal path time and phase offsets.

This information may be used in turn used to determine the offset estimates for locally generated PRN reference code and carrier phase tracking signals, or may be used to adjust a range measurement.

If multipath correlators are not available full-time for each channel, then the code delay for a fewer number of correlators, such as two for each channel, can be sequenced from epoch to epoch, so that over time, measurements from several points on the correlation function can be taken.

In another embodiment, the majority of the channels in a receiver can be left to operate normally, with one or more of the channels being dedicated to continuously sequencing from channel to channel to determine the multipath parameters for a partial PRN code being tracked.

There are several advantages to this arrangement. In environments such as commercial GPS coarse/acquisition (C/A) code applications, where the multipath distortion in the received composite signal is of the same order of magnitude as a PRN code chip time, the PRN receiver is capable of acquiring carrier and code lock over a wide range of operating conditions. Once the receiver is locked, it will automatically remain locked, even in the presence of multipath distortion.

An improvement in range measurement accuracy is actively accomplished without special antenna design, and without specifying the particular location of the antenna, even in differential ranging applications.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT

Figure 1:
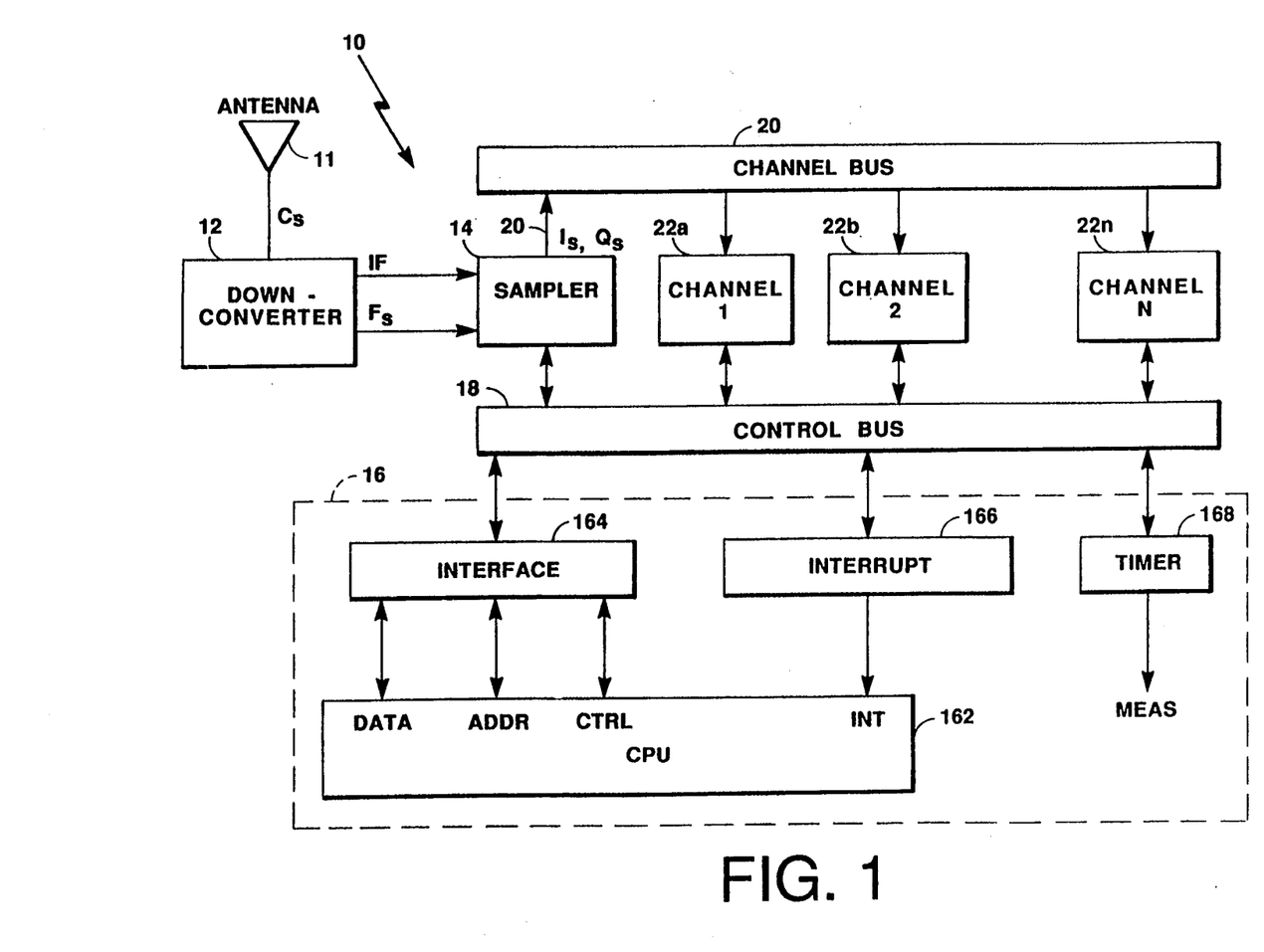
FIG. 1 is a high level block diagram of a PRN receiver which incorporates the invention, including its downconverter, sampler, channel, and processor circuits.

Now turning attention to the drawings, FIG. 1 is an overall block diagram of a pseudorandom noise (PRN) ranging receiver 10 constructed in accordance with the invention. It includes an antenna 11, a downconverter 12, an in-phase (I) and quadrature (Q) sampler 14, a processor 16, a control bus 18, a channel bus 20 and multiple channels 22a. 22b, ..., 22n, (collectively, the channels 22). The illustrated receiver 10 will be described herein as operating within the United States' Global Positioning System (GPS) using the commercial, coarse acquisition (C/A) pseudorandom codes, however, adaptations to other ranging systems are also possible.

The antenna 11 receives a composite signal $C_s$ consisting of the signals transmitted from all participating satellites within view, that is, within a direct line of sight of the antenna 11. When the GPS system is fully operational, signals from at least four and as many as eleven satellites may be received simultaneously at each location on the earth.

The composite signal $C_s$ is forwarded to the downconverter 12 to provide an intermediate frequency signal, IF. The IF signal is a downconverted and filtered version of the composite signal $C_s$. The downconverter 12 should have a bandpass filter which is sufficiently wide to permit several chips of the PRN coded signals to pass through. For the C/A code embodiment described here, this bandwidth is typically 8 MHz.

The downconverter 12 also generates a sample clock signal, Fs, which is four times the frequency of the IF signal, which indicates the points in time at which samples of the IF signal are to be taken by the sampler 14.

The sampler 14 receives the IF and $F_s$ signals and provides digital samples of the IF signal to the channels 22 via the channel bus 20. The samples consist of in-phase (I) and quadrature (Q) samples of the IF signal taken at the times indicated by the Fs signal, typically by an analog-to-digital converter which samples at precisely 90° phase rotations of the IF signal's carrier frequency. With the digital sample clock signal, $F_s$, chosen according to these guidelines, that is, with four samples taken in every IF carrier cycle, the output samples from the sampler 14 are thus in in-phase and quadrature order as I,Q, -I,-Q,I,Q . . . and so on. The I and Q samples are then separated and routed to the channels 22 on separate $I_s$ and $Q_s$ conductors of the channel bus 20, along with the $F_s$ signal. For more details of one embodiment of the downconverter 12 and sample 14, please refer to U.S. Pat. No. 5, 101,416 entitled "Multichannel Digital Receiver for Global Positioning System" issued Mar. 31, 1992, and assigned to NovAtel Communications Ltd.

Each channel 22 is normally assigned to process the signal transmitted by one of the satellites which is presently within view of the antenna 11. A given channel 22 thus processes the $I_s$ and $Q_s$ signals and tracks the carrier and code of the signal transmitted by its assigned satellite. As explained below, each channel 22 uses a carrier and code synchronizing circuit to frequency and phase-track the PRN encoded carrier signal by maintaining an expected Doppler offset unique to the desired satellite. Furthermore, each channel 22 contains multiple correlators to maintain phase lock with a locally generated PRN code reference signal as well, to remove the effects of any multipath distortion on the position measurement.

The locally generated PRN code reference signal is then used to decode the data from the assigned satellite. The resulting decoded data, including the satellite's ephemeris, time of day, and status information, as well as the locally generated PRN code phase and carrier phase measurements, are provided to the processor 16 via the control bus 18. The channels 22 are described in detail in connection with FIG. 2.

The sampler 14 and channels 22 are controlled by the processor 16 via the control bus 18. The processor 16 includes a central processing unit (CPU) 162 which typically supports both synchronous-type input/output (I/O) via a multiple-bit data bus DATA, address bus ADDR, and control signals CTRL and synchronous controller circuit 164, and an interrupt-type I/O via the interrupt signals, INT and an interrupt controller circuit 166. A timer 168 provides certain tinting signals such as a measurement trigger MEAS indicating a request for a range measurement to be taken. The operation of the processor 16 and its various functions implemented in software will be understood from the following discussion.

The composite signal $C_s$ received from the antenna 11 typically consists of signals transmitted by all satellites within view (that is, within a direct line-of-sight of the receiver 10), any interfering signals, such as multipath signals and noise. The carrier signal used by the GPS C/A ranging system is an L-band carrier at 1.57542 GigaHertz (GHz) with a PRN code rate of 1.023 MHz and a nominal transmitted power of −160 dBW. Natural background noise at about −204 dBW/Hz is typically mixed in with the L-band signals. In addition, one or more multipath signals are present in the composite signal $C_S$, as will be described below. For more detailed information on the format of the GPS system signals, see "Interface Control Document ICD-GPS-200, Sept. 26, 1984", published by Rockwell International Corporation, Satellite Systems Division, Downey, Calif. 90241.

Figure 5:
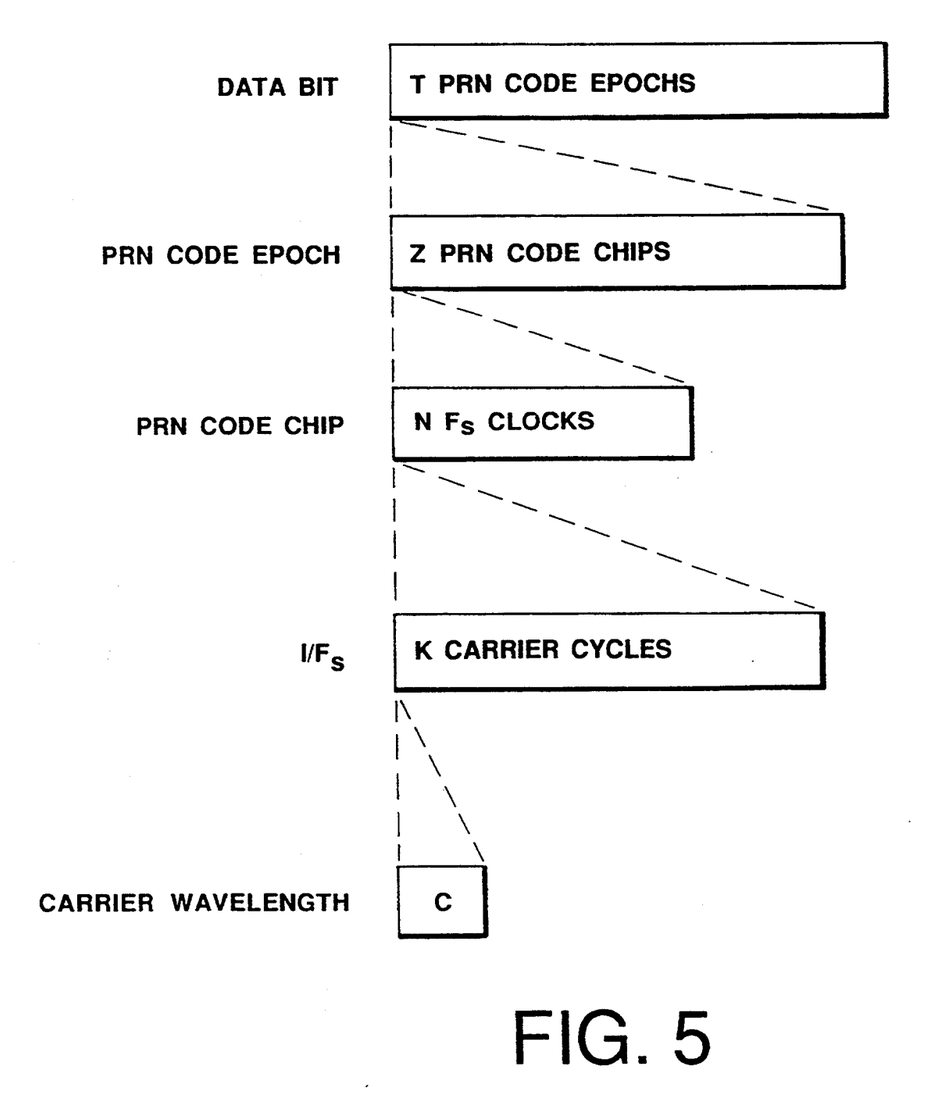
FIG. 5 is a timing diagram showing the relative duration of various portions of a received PRN signal.

FIG. 5 shows, on a distorted time scale, the relative durations of various components of a typical PRN ranging signal transmitted by a GPS satellite and certain of the signals in a preferred embodiment of a channel 22n.

A single carrier cycle has a particular duration, C. A single cycle of the digital sample signal clock $F_s$, consists of K carrier cycles.

A PRN code chip includes N cycles of the $F_s$ signal, and a PRN code epoch consists of Z PRN code chips, where Z is also known as the sequence length of the PRN code. One data bit typically consists of T PRN code epochs. For the preferred embodiment of the invention adapted to receive the GPS L 1 ranging signal, the carrier frequency is 1575.42 MHz, and K is 77, so that $F_s$ equals 20.46 MHz. In addition, a constant, N is 20, so that the PRN code chip rate is 1.023 MHz, and Z is 1023, so that the PRN code epoch rate is 1 kHz. T, another constant, is also 20, so that the data bit rate is 50 Hz.

Figure 2:
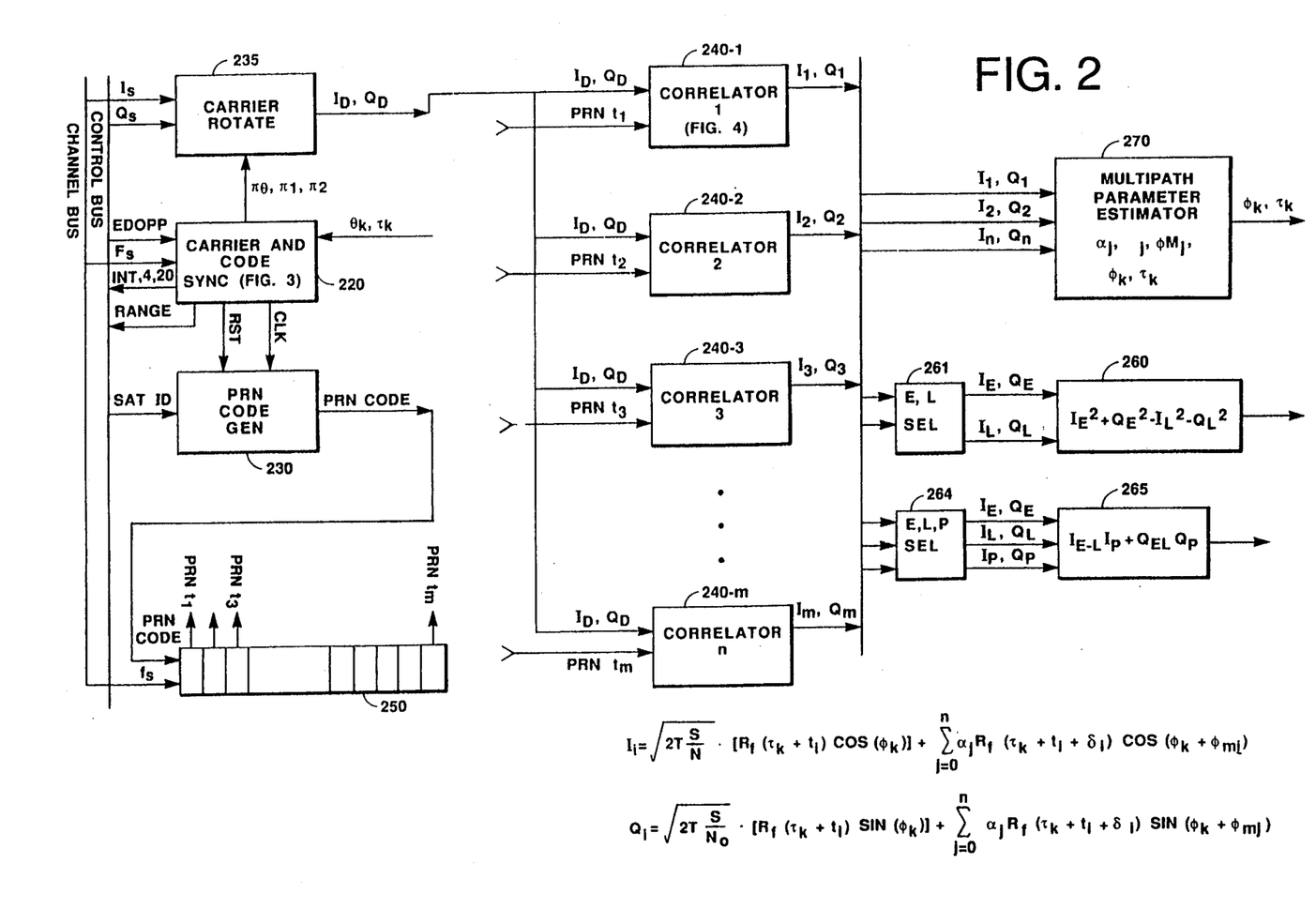
FIG. 2 is a block diagram of one of the channel circuits, showing multiple correlators being used in each channel.

A channel circuit 22n is shown in detail in FIG. 2. It includes a carrier and code synchronizer circuit 220, a PRN code generator 230, a carrier phase shifter 235, multiple correlators 240-1,240-2, 240-3 . . . 240-$m$ (collectively, correlators 240), a code shift register 250, an early minus late (or early, late) discriminator 260, a dot product (or punctual, early minus late) discriminator 265, and a multipath parameter estimator 270.

The PRN code generator 230 uses signals output by the synchronizer 220 to generate a local PRN reference signal, PRN CODE. The particular PRN CODE signal generated at any given time depends upon which satellite it is desired for the channel to be tuned to, as selected by the SAT ID input. PRN code generators such as code generator 230 are well known in the art.

The synchronizer 220 is a single numerically controlled oscillator (NCO) which uses the sample clock $F_s$ and appropriate instructions from the processor 16 to provide the control signals required by PRN code generator 230 and correlators 240 in the carrier or code carrier phase to non-coherently track the errors caused by residual Doppler and multipath distortion.

Figure 3:
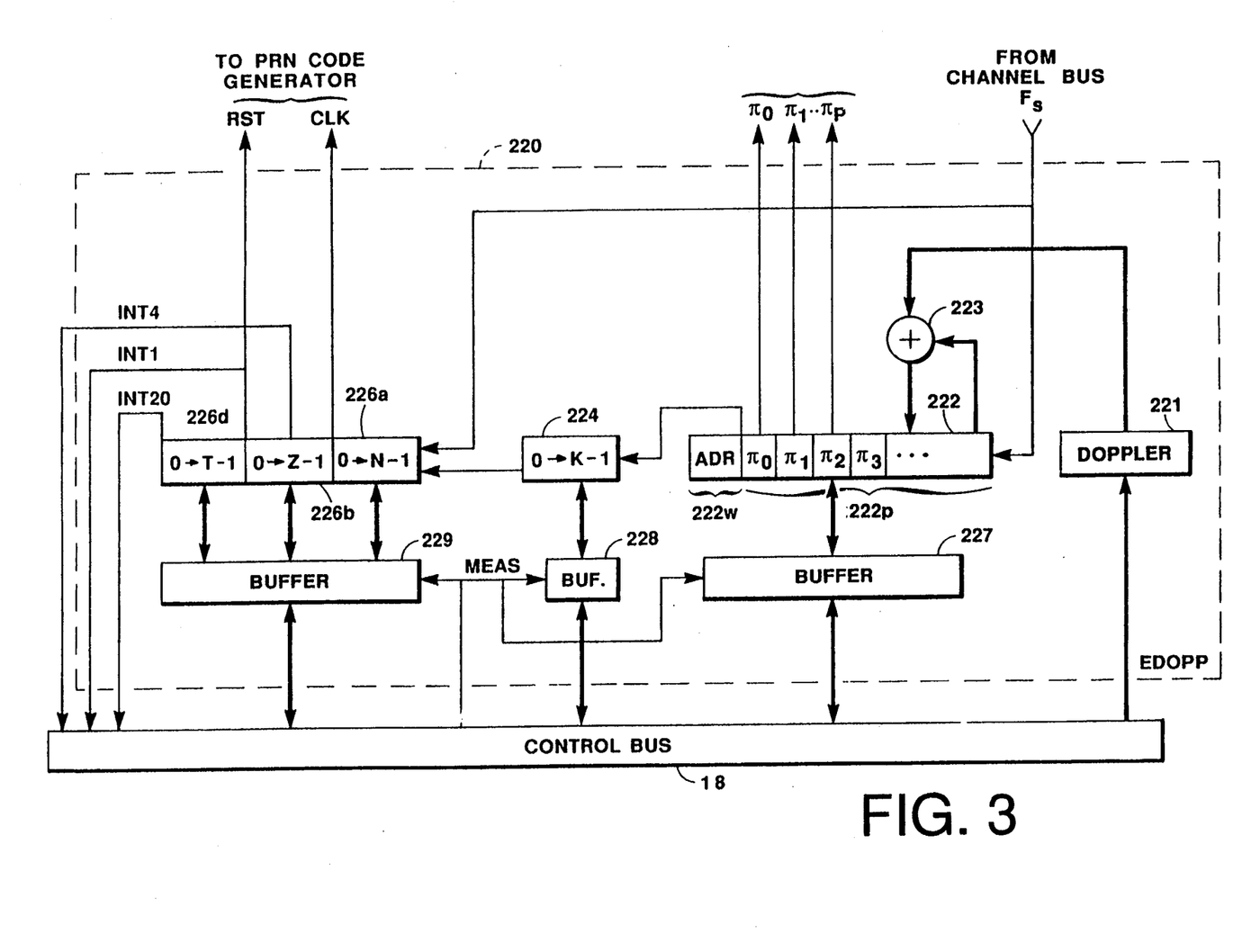
FIG. 3 is a block diagram of a carrier/code synchronizing circuit used in each channel circuit.

Before continuing with a detailed discussion of the channel 22n, refer to FIG. 3, which is a detailed block diagram of the carrier and code synchronizer 220. This element includes an expected Doppler rate register 221, an accumulated delta range (ADR) register 222, and a fine chip counter 224. A code phase generator circuit 226 also includes a subchip counter 226a, chip counter 226b, epoch counter 226d. Buffer circuits 227, 228, and 229 allow the processor 16 to load, read, and add to or subtract from the contents of the various counters and registers in the synchronizer 220.

The synchronizer 220 accepts the sample clock signal $F_s$ from the channel bus 20, an expected Doppler value EDOPP and corrected values for the registers and counters 222, 224 and 226 from the control bus 18. In response to these inputs, it provides a clock signal CLK and reset signal RST to the PRN code generator 230, as well as interrupt signals INT1, INT4, and INT20 to the control bus 18. An instantaneous carrier phase angle estimate is also provided via bits $\pi_0, \pi_1, \ldots \pi_p$ to the correlators 240.

The contents of the ADR register 222 and code phase generator 226 provide an instantaneous estimate of the transmit time of the particular satellite signal assigned to channel 22n. The difference between this estimate of the transmit time and the receiver time of day (as estimated by the timer 168 in FIG. 1) is then taken as the propagation time of that signal plus any receiver clock offset. By multiplying the propagation time by the speed of light, a precise measurement of the range from the receiver 10 to the assigned satellite may then be made by the processor 16. These measurements occur at selected time indicated by the measurement strobe MEAS from the timer 168, and are typically taken simultaneously across all the channels 22. The resulting range to each satellite is then used by the processor 16 to compute the position and or velocity of the receiver 10.

In operation, the expected Doppler rate register 221 is first loaded via the processor bus 18 with an estimated Doppler offset EDOPP for the particular satellite tracked by channel 22n. In most instances, such as when the receiver 10 has been operating for some time, the EDOPP estimate may be taken from almanac data already received from satellites to which the receiver 10 has been synchronized, since the almanac data from each satellite includes an estimated position of all other operating satellites. However, if this almanac data is not available, such as when the receiver 10 is first turned on, this estimate may be determined by successive approximation techniques, as described in the aforementioned U.S. Pat. No. 5,101,416.

The Doppler value is specified in carrier Doppler cycles per $F_s$ pulse. For example, if the expected Doppler frequency is +4.45 kilohertz (kHz), which is a possible Doppler frequency for a stationary receiver and an approaching satellite, dividing by a typical $F_s$ frequency of 20.46 MHz for the GPS L1 embodiment results in an expected Doppler shift of approximately 0.00044 carrier cycles per $F_s$ pulse. Specified in this way, the Doppler value will always be less than one.

The ADR register 222, which provides an estimate of the range to the satellite being tracked, is divided into a whole cycle portion 222w and a partial cycle portion 222p. As shown, an adder 223 is arranged to add the contents of the Doppler register 221 to the partial cycle portion 222p of the ADR 222 upon the occurrence of every Fs pulse. The most significant bits 0, 1, . . . , p of the partial cycle portion 222p thus provides an instantaneous expected carrier phase angle in cycles.

When the partial cycle register 222p has a carry out, the whole number portion 222w is incremented and the fine chip counter 224 is also incremented. If the partial cycle register 222p requires a borrow, then the whole number portion 222w and fine chip counter 224 are decremented.

The subchip counter 226a is clocked by the $F_s$ signal and controlled by the fine chip counter 224. Subchip counter 226a is nominally a 0 to N-1 counter controlled directly by the Fs signal, but may be adjusted to count one extra cycle or one fewer cycle depending upon the state of the fine chip counter 224. In particular, when the fine chip counter carries out, i.e., increments from K−1 to 0, a cycle is stolen from the sub chip counter 226a to keep it synchronized with the ADR 222. In other words, this event causes the subchip counter 226a to count only to N−2 for one iteration.

When the fine chip counter 224 borrows, i.e., decrements from 0 to K−1, a cycle is added to the subchip counter 226 so that it counts from 0 to N for one iteration.

By periodically removing or adding one cycle of the sample clock Fs, the locally generated PRN code (as controlled by the output signals RST and CLK of code phase generator 226) remains synchronized with the locally generated carrier phase (as indicated by the state of the ADR 222). With this arrangement, as long as the carrier phase indicated by the ADR 222 remains locked to the incoming carrier, the code phase generator 226 will remain locked to the incoming PRN code. This is accomplished non-coherently, in the sense that the local reference signal, Fs, need not remain phase locked to the carrier of the intermediate frequency signal, IF, in order for the PRN code generator 230 to remain phase-locked.

The most significant bit of the subchip counter 226a is used as a clock signal, CLK, to indicate a PRN code chip edge. In the preferred embodiment for the GPS L1 carrier, the subchip counter 226a counts from zero to nineteen since N equals twenty, i.e., there are twenty $F_s$ cycles per PRN code chip (FIG. 5).

The chip counter 226b is used to determine the duration of a complete PRN code sequence. For the GPS embodiment, there are 1,023 C/A code chips in a PRN code epoch, and thus the chip counter 226b counts from zero to 1022. The most significant bit, INT1 indicates the end of a complete PRN code epoch to the processor 16; it is also used to reset the local PRN code generator 230. Another clock signal, INT4, which is four times the rate of INT1 (i.e., the third most significant bit of the chip counter 226b) is also generated. Both INT1 and INT4 may be used to interrupt the processor 16 to service the correlators 240 during an initial locking sequence, as will be described shortly.

Finally, the epoch counter 226d is used to indicate the end of a data bit, after T PRN code epochs. This indication is given by the most significant bit of the epoch counter 226d, which is output as the INT20 signal.

The carrier tracking loop is inherently much more sensitive than the code DLL and is able to measure small changes extremely accurately. Assuming the carrier loop is tracking properly, the fine chip counter 224 in conjunction with the subchip counter 226a, enables the channel 22n to accurately track any relative motion of the receiver 10 with respect to the satellite.

By returning now to FIG. 2, the operation of a typical receiver channel 22n will be understood in greater detail. A carrier phase shifter 235 accepts the $I_s$ and $Q_s$ samples, along with the instantaneous carrier phase bits $\pi_1, \pi_2, \ldots, \pi_p$, from the synchronizer 220. The carrier phase shifter 235 then phase rotates the $I_s$ and $Q_s$ samples by an amount indicated by the instantaneous carrier phase angle estimate generated by the synchronizer 220, and provides outputs $I_D$ and $Q_D$ according to the following expressions:

$$I_D = I_s \cos(\text{II}) + Q_s \sin(\text{II})$$

$$Q_D = Q_s \cos(\text{II}) - I_s \sin(\text{II})$$

where PRN is the current value of the PRN CODE input and II is the instantaneous carrier phase estimate represented by the bits $\pi_1, \pi_2, \ldots, \pi_p$. Since the $I_s$ and $Q_s$ samples are in digital form, this phase shift operation is performed by appropriate digital circuits. By removing the instantaneous carrier shift in the same operation at every $F_s$ clock pulse, signals with very high Doppler offsets may be processed before any significant power loss is encountered.

The shift register 250 receives the PRN code signal from the PRN code generator 230 and generates a plurality, m, of time-shifted PRN code replica signals $PRNt_1, PRNt_2, \ldots, PRNt_m$. The time shifts imparted to the PRN code replica signals are typically distributed about an expected code time delay, in a manner which will be described below in connection with FIGS. 6 through 10.

Figure 4:
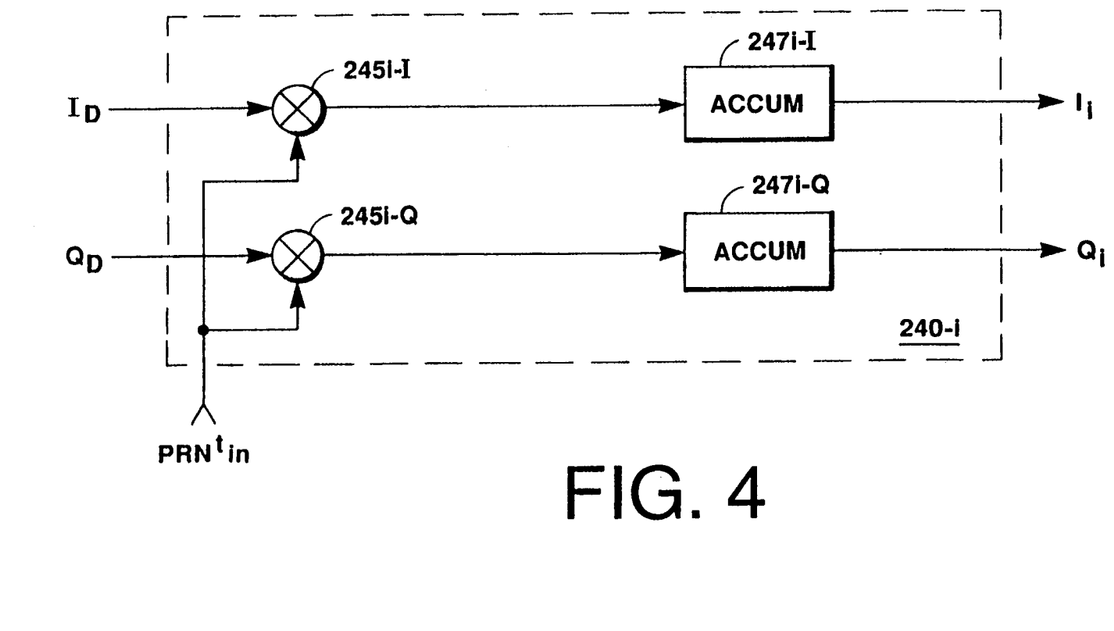
FIG. 4 is a block diagram of a correlator circuit used in each channel circuit.

The time shifted PRN code replica signals $PRNt_1$, $PRNt_2, \ldots PRNt_m$ are then fed to respective ones of the correlators 240-1, 240-2 ... 240-$m$. Each correlator 240-$i$ in turn feeds the incoming phase-shifted samples $I_D$, $Q_D$ and the respective PRN code replica $PRNt_i$ assigned to that correlator, to a complex multiplier circuit. As shown in FIG. 4, the multiplier circuit includes a pair of multipliers 245I-i, 245Q-i. A pair of accumulators 247I-i and. 247Q-i perform a low frequency filtering function on the correlated $I_D$ and $Q_D$ data, by simple accumulation of successive samples, to produce averaged correlator outputs $I_i$ and $Q_i$.

The discriminators 260 and 265, typically implemented by programming the processor 18 (FIG. 1) operate on the outputs of the m correlators $I_1$, $Q_1$, $I_2$, $Q_2, \ldots, I_m$, $Q_m$ to determine the carrier and PRN code drift. When a difference in the locally generated PRN code and the received code is detected, the synchronizer 220 is corrected by adjusting the internal values in its counters, 222, 224 or 226, or Doppler register 221. The discriminators 260 to 265 and synchronizer 220 thus complete a delay lock loop (DLL).

In an initial synchronization mode, the (early, late) discriminator 260 is used. this discriminator 260 makes use of the fact that when the synchronizer 220 is exactly in phase, one of the correlators 240 which is early by a certain fraction of a PRN code chip time is expected to have the same output power as another correlator 240 which is late by the same fraction of a PRN code chip time.

A correlator output selector 261 thus selects one of the m pairs of correlator outputs as the early correlator outputs, $I_E$, $Q_E$, and another pair as the late correlator outputs $I_L$, $Q_L$. The early correlator output $I_E$, $Q_E$ is preferably taken from one of the correlators 240 having a PRN code replica signal PRNt; which was expected to be early by one-half a PRN code chip time. The late correlator outputs $I_L$, $Q_L$ are taken from a correlator 240 which is expected to be late by one half a chip time. Thus, the time delay spacing of the early and line correlators 240 in this initial acquisition mode is one chip time.

Next, the PRN code for the desired satellite is loaded into the PRN code generator 230 via the SEL lines. All possible frequencies and code phase delays are then successively tried in an attempt to obtain frequency and code lock with the satellite signal received from the assigned to the channel 22. In particular, the carrier delays are swept by trying different EDOPP values. Different code delays are swept by adjusting the code counters 224, 226a, and 226b via the buffers 227, 228, and 299. At each code and frequency offset, the outputs $I_E$, $Q_E$ and $I_L$, $Q_L$ are read and a power level is calculated by the discriminator 260, such as by determining the square of the difference in their powers. This difference is compared to a predetermined threshold to determine whether the satellite has been locked onto or not. If lock is not indicated, the next carrier and code phase are tried.

The discriminator 260 must be allowed to dwell for an appropriate time at each code and carrier delay. When searching for strong satellites, where the signal to noise ratio is above 45 dBHz, a dwell time as short as $\frac{1}{4}$ of a PRN code epoch is used. For weaker satellites, a dwell time approximately equal to the PRN code epoch time is used.

Alternatively, a different, so-called dot-product discriminator 265 may be used. in this mode, another selector 264 selects three of the correlators output pairs as punctual (P), early (E), and late (L). The discriminator function of interest in this correlator is $$I_{E-L} \cdot I_P + Q_{E-L} \cdot Q_P$$

which is why it is referred to as a dot-product discriminator. In general, carrier phase tracking is better with respect to noise in the dot-product mode because of the availability of a punctual power estimate, which has a greater signal strength in the presence of noise.

After initial code locking, the delay between the early (E) and late (L) correlators may be slowly decreased by changing which of the correlators 240 are selected as the early and late correlators. By narrowing the DLL delay in this manner, the noise level of the discrimination function performed by the power estimator 265 is decreased, and its accuracy is increased.

Figure 6:
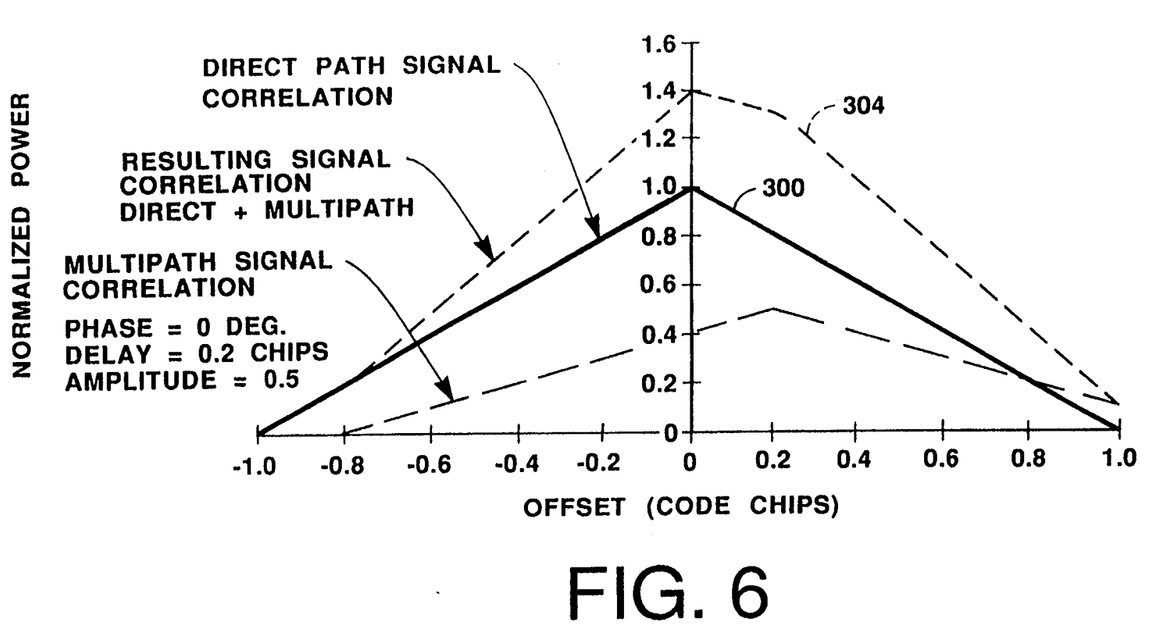
FIG. 6 is a plot of a direct path signal correlation, a multipath signal correlation, and the resulting direct with multipath correlation.

Both of these discriminators 260 and 265 operate under the assumption that the correlation function is ideal, that is, that it is symmetric and will peak at or near the position of the punctual correlator. As indicated by the curve 300 shown in FIG. 6, this is indeed true for the direct path signal, which will have a peak power at a time offset equal to zero code chips. In this ideal situation, the correlation power decreases linearly as the offset increases, in both the negative and positive directions, until the magnitude of the offset equals zero at a time difference of plus or minus one code chip time. The amplitude scale in FIG. 6 is normalized to a peak power equal to one(1).

However, this ideal situation will only occur if there are no multipath signals present. Since the number of multipath signals present at any given location is a function of the satellite and antenna position relative to any reflectin objects, anywhere from zero to several individual multipath signals may be present at any given time.

In some instances, the correlation between a multipath signal and the local reference PRN signals will have a similar triangular shape. The shape is the same because the multipath signal is identical to the direct path signal but takes a slightly different, longer path to the receiver. The curve 302 represents the correlation between the same reference PRN signal and a multipath signal having an additional propogation delay, representing the additional time required for the multipath signal to reach the receiver. In the example shown, the additional propagation delay is 0.2 chips.

Since the multipath signal also arrives at the receiver, there will always be some correlation with both the direct path signal and the multipath signal. The resulting correlation function is thus the sum of the direct path correlation 300 and multipath correlation 302, yielding an acutally observed correlation function 304. As is event from the curve, in the presense of such a multipath signal, the observed correlation function 304 deviates from that of the direct path signal, which is the signal which the receiver channel 22$n$ is actually attempting to lock onto.

In the example shown in FIG. 6, the multipath signal was assumed to have a differential phase of zero degrees, that is, the phase as that of the direct path signal. In this instance, the peak of the correlation plot 304 still occurs near the zero offset, and the aforementioned power estimators 260 and 265 may still tend to find the correlation peak at or near the correct offset. However, in other instances, this is not the case.

In particular, it is also quite possible that in the act of being reflected by an object, the carrier of the multipath signal will have had a relative phase difference imparted upon it which is different from the phase of the carrier of the direct path signal. The amount of this carrier phase offset depends upon the exact position of the reflecting object with respect to the satellite and the receiver. The effect on the non-coherent receiver channel 22n which has been described herein is that the multipath correlation signal will in effect be multiplied by a constant equal to the cosine of this phase difference.

Figure 7:
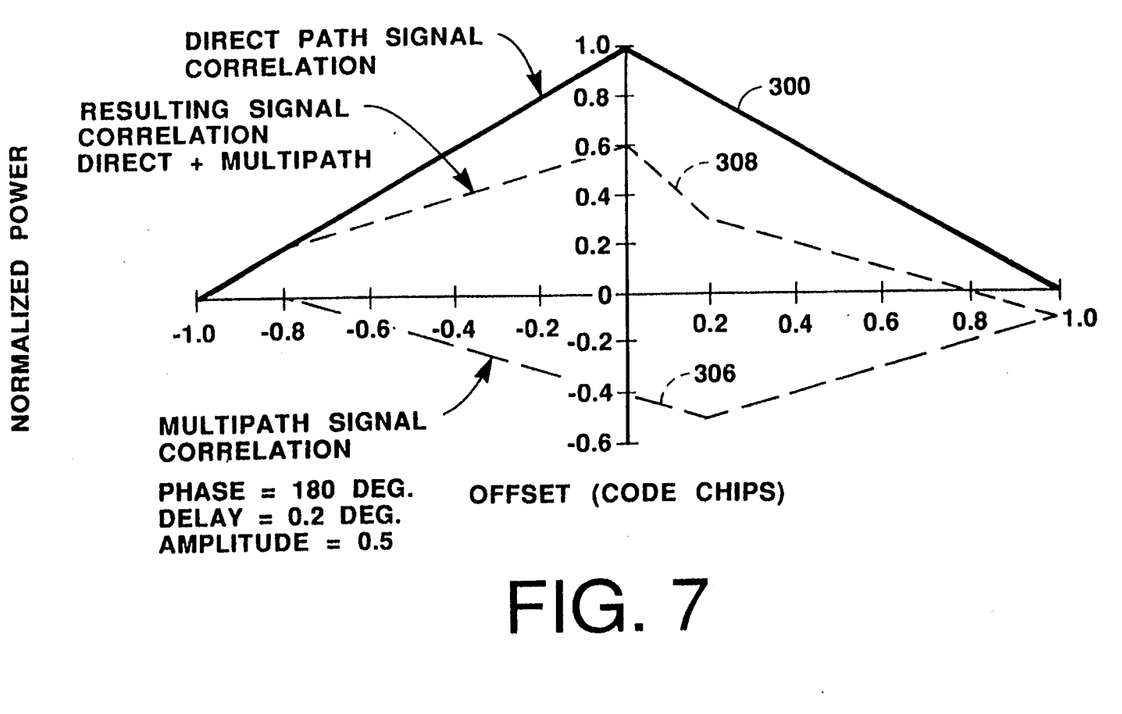
FIG. 7 is a plot of another multipath correlation with different phase offset.

Thus, maximum values for a multipath correlation signal will occur when the relative carrier phase difference is 0° or 180°, and a minimum correlation values will occur when this phase difference is 90° or 270°. In FIG. 6, this carrier phase difference was assumed to be zero, and thus a positive correlation existed between the multipath and direct path signals. However, as shown in FIG. 7, when the multipath signal has a carrier phase difference of 180°, a negative correlation with the reference signal will result, since the cosine of 180° is minus one. The multipath correlation function 306 thus has a negative amplitude peak, and the sum of the direct path and multipath correlations 308 no longer peaks near zero time offset, and has significant shape distortion.

This in turn means that the early, punctual, and late correlators, as processed by the discriminators 260 and 265 alone, may not adequately track the PRN code of the desired direct path signal. The early minus late discriminator 260, in particular, assumes that the power at the early and late correlator locations is the same, and that the dot product discriminator 265 assumes that the power at the output of the punctual correlator is the position of maximum correlation power.

Thus, although the DLL tracking loop formed by the discrimators 260 and/or 265 may be adequate for initial code phase locking, they may in some instances tend to urge the receiver 22 to lock to a position which is offset from the actual position. This in turn leads to errors in the measurement of the propagation time from the satellite, and ultimately, errors in the calculated position of the receiver 10.

In the exemplary PRN ranging system being discussed, the incoming signal is band limited by the sampling rate of the channel 22n, which further effects the shape of the correlation function. That is manifested by a rounding off of the peaks in the correlation function, and a shift in the positive direction. Taking into consideration the limited bandwidth, approximately 8 MHz in this embodiment, the actual correlator response will thus be somewhat smoothed out and shifted in time, such as that shown in FIG. 8.

Figure 9:
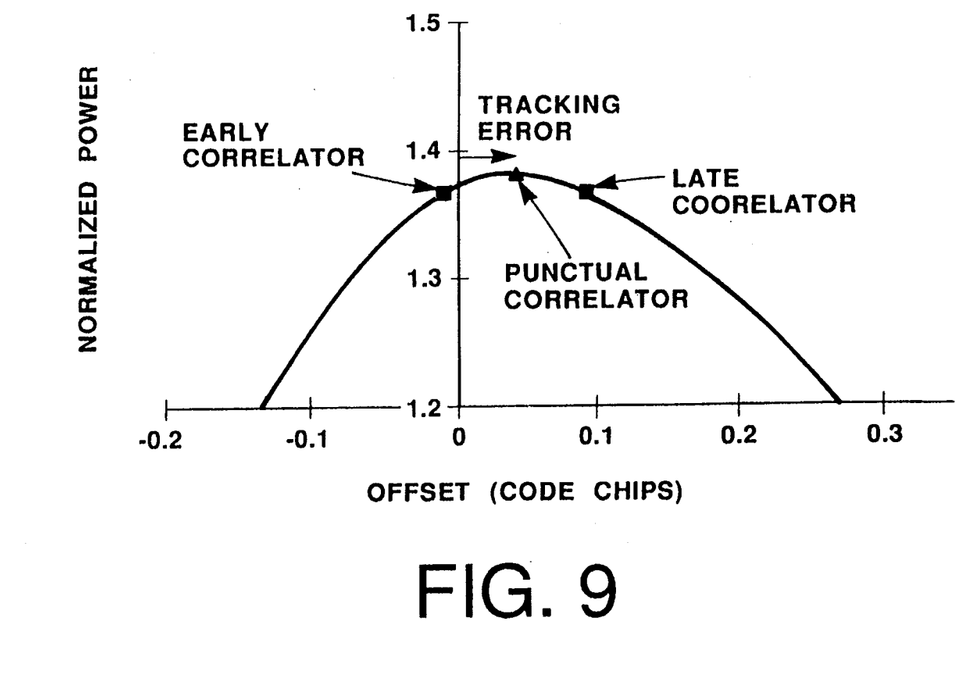
FIG. 9 shows the resulting tracking error.

As better seen in the magnified view of FIG. 9, the early, punctual, and late correlators will tend to lock onto a position which is offset in the positive time direction by approximately 0.05 chips in this example. This, in turn, leads to a range measurement error of the same magnitude, which may mean a distance error of more than 10 meters in the example shown.

Additional ones of the multiple correlators 240-1. 240-2 . . . ,240-m can thus be used to generate a more accurate estimate of the shape of the composite multipath and direct path correlation signal, which in turn can be used to develop better update estimates for the PRN code DLL and carrier phase tracking loops.

To understand this further, consider that signals generated in the channel 22n, even in the presence of multipath, can be predicted to follow a mathematical model. Assuming that the channel 22n makes use of a non-coherent carrier and code synchronizer 230 to adjust for the carrier and Doppler error as described above, then the components of the inputs to the correlators $I_D$ and $Q_D$ due to the direct path signal can be expressed, respectively, as $$I = A \cdot R_f(\tau_k) \cos(\phi_k)$$

$$Q = A \cdot R_f(\tau_k) \sin(\phi_k)$$

where A is an amplitude factor depending upon the signal to noise ratio at the input to the receiver, $R_f(t)$ is the unfiltered PRN code autocorrelation function, $\tau_k$ is the code tracking error at time $t_k$, and $\phi_k$ is the residual phase tracking error also at time $t_k$. The contribution of a given multipath signal can thus be expressed as:

$$I_m = R_f(\tau_k - \delta) \cos(\phi_m + \phi_k)$$

$$Q_m = R_f(\tau_k - \delta) \sin(\phi_m + \phi_k)$$

where $\delta$ is the relative time delay of the multipath signal, and $\phi m$ is the relative phase of the multipath component carrier. By applying these equations to the expression for the dot-product discriminator 265, its output can be modelled as:

$$\begin{aligned}D\tau_k = &\{R_f(\tau_k - d/2) - R_f(\tau_k + d/2)\} \cdot R_f(\tau_k) + \\&\alpha^2\{R_f(\tau_k - d/2 - \delta) - R_f(\tau_k + d/2 - \delta)\} \cdot R_f(\tau_k - \delta) + \\&\alpha\{R_f(\tau_k - d/2) - R_f(\tau_k + d/2)\} \cdot R_f(\tau_k - \delta)\cos(\phi m) + \\&\alpha\{R_f(\tau_k - d/2 - \delta) - R_f(\tau_k + d/2 - \delta)\} \cdot R_f(\tau_k)\cos(\phi m)\end{aligned}$$

with d being the spacing between the early and late correlators in PRN code chips.

Figure 8:
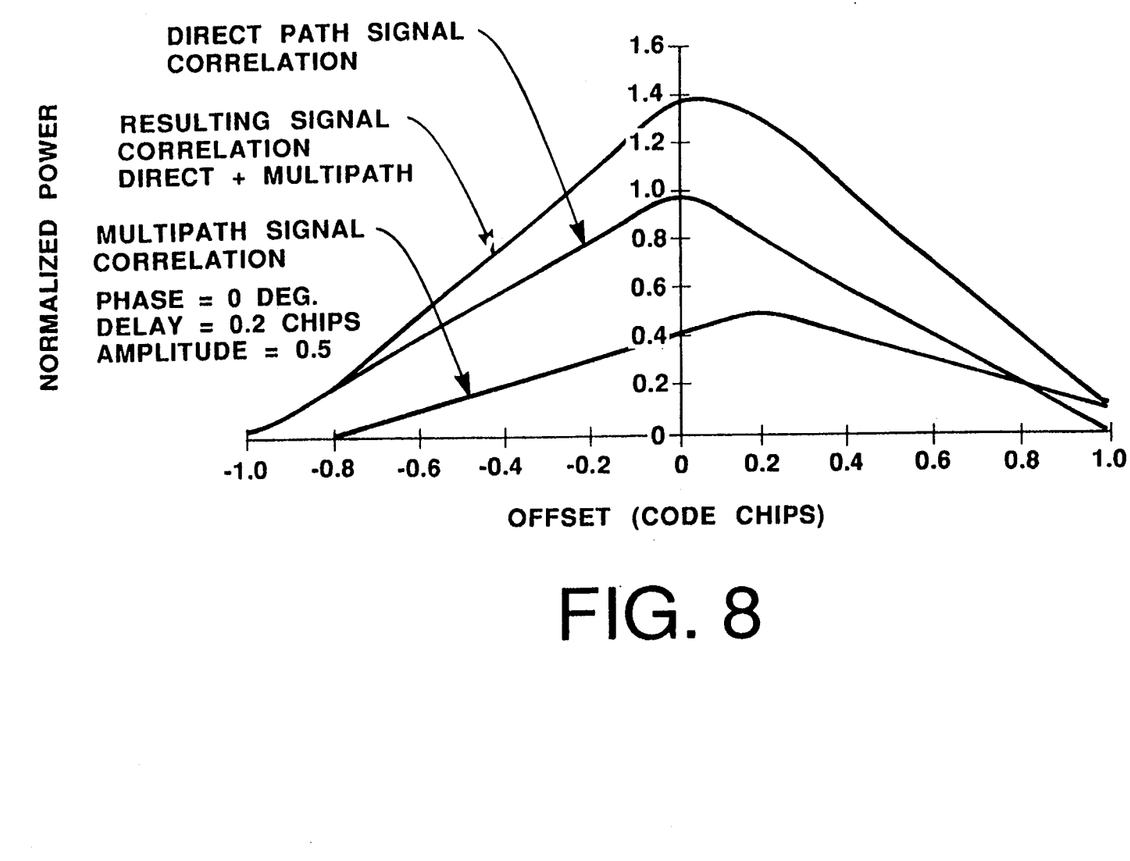
FIG. 8 is a plot showing the nadlimiting effect of the channel 22.

A similar expression can thus be developed in the same manner for the $I_i$ and $Q_i$ signals generated by an exemplary correlator 240-i in response to each one of the plurality, j, of multipath signals:

$$I_i = A \cdot \left[ R_f(\tau_k + t_i) \cdot \cos(\phi_k) + \sum_{j=0}^{n} \alpha_j \cdot R_f(\tau_k + t_i + \delta_j) \cdot \cos(\phi_k + \phi m_j) \right]$$

$$Q_i = A \cdot \left[ R_f(\tau_k + t_i) \cdot \sin(\phi_k) + \sum_{j=0}^{n} \alpha_j \cdot R_f(\tau_k + t_i + \delta_j) \cdot \sin(\phi_k + \phi m_j) \right]$$

where A is the relative amplitude of the direct path component, $R_f$ is the cross correlation between the incoming filtered signal PRN code and the unfiltered reference code, $t_i$ is the reference code offset of correlator 240-i, $\tau_k$ is the code tracking error at time $t_k$ (also referred to as epoch k), $\phi_k$ is the carrier phase error at epoch k, $\alpha_j$ is the relative amplitude of multipath component j. $\delta_j$ is the delay of multipath component j, $\phi m_j$ is the phase of multipath component j, and n is the number of multipath components. A measured correlator power output, $P_i$, can be determined for each correlator 240-i as $$P_i = \sqrt{I_i^2 + Q_i^2},$$

from which the actual correlation curve shown in FIG. 8 can be determined.

Figure 10:
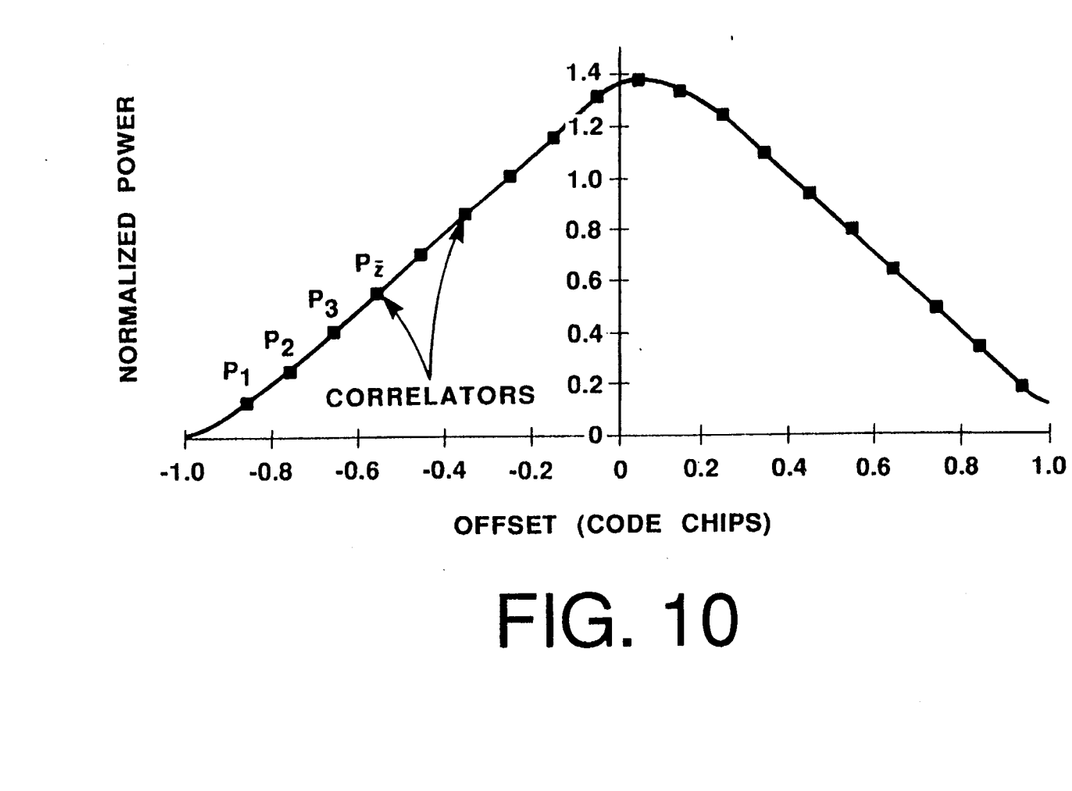
FIG. 10 is another plot of the band limited correlation function showing the distribution of the multiple correlators.

FIG. 10 is an exemplary plot of the same correlation signal shown in FIG. 8, showing how in the case of m equal to 19, the $t_i$ for each of the nineteen correlators may be evenly distributed across the correlation time scale. Thus, by distributing the spacing of the correlators 240 with different code offsets $t_i$, and then sampling the outputs of the multiple correlators 240-1,240-2 . . . ,240-n, the above system of equations can be formed to solve formed the $\alpha_j$, $\delta_j$, and $\phi m_j$ of each multipath component, as well as the code tracking error $\tau_k$ carrier phase error $\phi_k$ of the direct path signal.

The system of equations can be solved in any suitable fashion by the parameter estimator 270 (which is also typically embodied in software for the processor 18). For example, least squares estimation, maximum likelihood estimation, and other signal parameter estimation techniques which are known in the art may be used.

Once the set of simultaneous equations is solved for code tracking error $\tau_k$ and carrier phase error $\phi_k$ of the direct path signal, the estimates of the values of these parameters can be used by the system in several different ways.

In one approach, the tracking loop implemented by the discriminators 260 and/or 265 can be left in place, and the code tracking error $\tau_k$ can be used as a final correction to the range estimate, as maintained by the carrier and code synchronizer 220.

Alternatively, assuming the parameter estimator 270 can perform the necessary calculations quickly enough, the code tracking error $\tau_k$ and carrier phase error $\phi_k$ may be fed back to control the carrier and code synchronizer 220. In particular, the carrier phase error, $\phi_k$, can be added by the processor 18 back into the range register 222, and the code tracking error $\tau_k$ can be added into the PRN code register 226.

Also, depending upon the system requirements, the multiple correlators 240 may be implemented in different ways. One approach would be to have the physical number of correlators in each channel equal to m. This approach might be necessary in applications where the receiver is subjected to environments where the multipath changes rapidly.

However, in most instances, once initial code lock is acquired, the correlation power estimates can be assumed to be stable for at least several seconds at a time. Thus, there may be as few as two physical correlators per channel, as long as the correlators have adjustable code delay spacing. The code delay spacing may be sequenced from epoch to epoch, so that over time, measurements of the correlation power at each one of the m time offsets ($t_i$'s) of interest are taken.

In another approach, all of the correlators in all of the channels 22a, 22b, . . . , 22n can be periodically set to track the same PRN code for a certain period of time. All channels 22 can then be sequenced through the PRN codes for each satellite of interest, so that over time, all desired $I_i$ and $Q_i$ signals will be determined.

Finally, the majority of the channels 22 in a receiver may be left to operate in the discriminators mode, while one or more of the channels 22 is dedicated to continually sequencing from channel to channel to supplement the correlation parameter estimates for each satellite being tracked.

I claim:

1. A receiver for demodulating and decoding a composite radio frequency (RF) signal consisting of a plurality of transmitted pseudorandom noise (PRN) encoded signals comprising:

an RF downconverter, connected to receive the composite RF signal and to provide a composite intermediate frequency (IF) signal;

means for generating a local sample clock signal;

a sampling circuit, connected to receive the composite IF signal and the local sample clock signal, and to provide digital in-phase (I) samples and quadrature (Q) samples of the composite IF signal;

a plurality of channel circuits, each channel circuit for demodulating and decoding one of the transmitted PRN encoded signals, and connected in parallel with the other channel circuits such that the each channel circuit receives the I samples and Q samples at the same time as the other channel circuits, wherein each channel circuit further comprises:

a PRN code signal generator, connected to receive a synchronizing adjustment signal and to provide a local reference PRN code signal;

means for decoding the I and Q sample signals, connected to receive the I samples, the Q samples, and the local reference PRN code signal, the decoding means for multiplying the I and Q samples by the local reference PRN code signal, and providing decoded I and Q samples;

autocorrelation means, connected to receive the decoded I and Q samples, for determining the autocorrelation power level at multiple code phase delays; and parameter estimator means, connected to receive the autocorrelation power level at multiple code phase delays, for determining paramenters of a direct path signal to the receiver.

2. A receiver as in claim 1 wherein each channel circuit further comprises:

means for providing an expected carrier phase signal;

a synchronizing circuit, connected to receive the sample clock signal, the expected carrier phase signal, and a synchronizing adjustment signal, and connected to provide an accumulated carrier phase signal and a PRN code phase control signal, the accumulated carrier phase signal and PRN code phase signals being synchronous with each other;

carrier rotation means, connected to receive the I samples, the Q samples, and the accumulated carrier phase signal, for phase-rotating the I and Q samples by an amount indicated by the accumulated carrier phase signal;

wherein the autocorrelation means provides the synchoronizing adjustment signal to the synchronizing circuit, and wherein the PRN code phase signal is provided to the PRN code signal generator.

3. A receiver as in claim 1 wherein the autocorrelation power level is determined at more than three code phase delay points.

4. A receiver as in claim 1 wherein the direct path signal parameter being estimated is a direct path code tracking error.

5. A receiver as in claim 1 wherein the direct path signal parameter being estimated is a direct path carrier phase tracking error.

6. A receiver as in claim 1 wherein the parameter estimator means also estimates the phase tracking error of one or more multipath signals.

7. A receiver as in claim 1 wherein the parameter estimator means also estimates the carrier tracking error of one or more multipath signals.

8. A receiver as in claim 1 wherein the autocorrelation power level at multiple code phase delays is determined by a like multiple number of physical correlator circuits.

9. A receiver as in claim 1 wherein the autocorrelation power level at multiple code phase delays is determined by a adjusting the code delay spacing of one or more physical correlator circuits.

10. A receiver for demodulating and decoding a composite radio frequency (RF) signal consisting of a plurality of transmitted pseudorandom noise (PRN) encoded signals comprising:

an RF downconverter, connected to receive the composite RF signal and to provide a composite intermediate frequency (IF) signal;

means for generating a local sample clock signal;

a sampling circuit, connected to receive the composite IF signal and the local sample clock signal, and to provide digital in-phase (I) samples and quadrature (Q) samples of the composite IF signal;

a plurality of channel circuits, each channel circuit for demodulating and decoding one of the transmitted PRN encoded signals, and connected in parallel with the other channel circuits, such that each channel circuit receives the I samples and Q samples at the same time as the other channel circuits, wherein each channel circuit further comprises:

means for providing an expected carrier phase signal;

a synchronizing circuit, connected to receive the sample clock signal, the expected carrier phase signal, and a synchronizing adjustment signal, and connected to provide an accumulated carrier phase signal and a PRN code phase control signal, the accumulated carrier phase signal and code phase signals being synchronous with each other;

a PRN code signal generator, connected to receive the PRN code phase control signal and to provide a local reference PRN code signal;

decoding and carrier rotation means, including means for simultaneously demodulating and decoding the I and Q sample signals, connected to receive the I samples, the Q samples, the local reference PRN code signal, and the accumulated carrier phase signal, the demodulating means for phase-rotating the I and Q samples by an amount indicated by the carrier phase signal, and the decoding means for multiplying the I and Q samples by the local reference PRN code signal, and providing decoded I and Q samples;

correlation means, connected to receive the decoded I and Q samples, for determining multiple correlation power levels for at least three code phase delays;

parameter estimating means, connected to receive the multiple correlation power levels, and for providing and estimate of a direct path time delay and one or more multipath time delays to the receiver; and means for providing the synchronizing adjustment signal to the synchronizing circuit by comparing the estimates of the direct path time delay and the one or more multipath time delays, wherein a first and second code phase delay are dynamically narrowed by being set to a predetermined wide correlator delay equal to a PRN code chip time during an initial PRN code lock acquisition period, and by being set thereafter to a predetermined narrow correlator delay equal to a fraction of a PRN code chip time.

11. A method for demodulating and decoding a composite signal consisting of a plurality of transmitted pseudorandom noise (PRN) encoded signals comprising:

sampling the composite signal in synchronism with a local sample clock signal, and thereby providing digital in-phase (I) samples and quadrature (Q) samples of the composite signal;

feeding the I samples and Q samples to a plurality of channel circuits, each channel circuit connected in parallel with the other channel circuits such that each channel circuit receives the I samples and Q samples at the same time as the other channel circuits;

within each channel circuit:
generating a local reference PRN code signal in response to a synchronizing adjustment signal;
decoding the I and Q samples, by multiplying the I and Q samples by the local reference PRN code signal, and in response thereto, producing decoded I and Q samples;
determining the correlation power level of the I and Q samples at multiple code phase delays; and
estimating the parameters of a direct signal path to the receiver from the correlation power levels at the multiple code phase delays.

12. A method as in claim 11 further comprising:
providing an expected carrier phase signal;
producing an accumulated carrier phase signal and a PRN code phase control signal which are synchronous with one another, by combining the sample clock signal, the expected carrier phase signal, and a synchronizing adjustment signal; and
phase-rotating the I and Q samples by an amount indicated by the accumulated carrier phase signal.

13. A method as in claim 11 wherein the correlation power level is determined at more than three code phase delays.

14. A method as in claim 11 wherein the direct path signal parameter being estimated is a direct path code tracking error.

15. A method as in claim 11 wherein the direct path signal parameter being estimated is a direct path carrier phase tracking error.

16. A method as in claim 11 wherein a phase tracking error of one or more multipath signals is also estimated.

17. A method as in claim 11 wherein a carrier tracking error of one or more multipath signals is also estimated.

18. A method as in claim 11 wherein the autocorrelation power level at multiple code phase delays is determined by a like multiple number of physical correlator circuits.

19. A receiver as in claim 11 wherein the autocorrelation power level at multiple code phase delays is determined by a adjusting the code delay spacing of one or more physical correlator circuits.

* * * * *